United States Patent [19]

Teramachi

[11] Patent Number: 4,620,351

[45] Date of Patent: Nov. 4, 1986

[54] UNLIMITED SLIDING BALL SPLINE ASSEMBLY

[76] Inventor: Hiroshi Teramachi, 34-8, Higashi-Tamagawa 2-Chome, Setagaya-ku, Tokyo 158, Japan

[21] Appl. No.: 721,124

[22] Filed: Apr. 8, 1985

Related U.S. Application Data

[63] Continuation of Ser. No. 465,926, Feb. 14, 1983.

[30] Foreign Application Priority Data

| Feb. 13, 1982 [JP] | Japan | 57-20659 |
| Feb. 13, 1982 [JP] | Japan | 57-20660 |
| Feb. 16, 1982 [JP] | Japan | 57-22032 |

[51] Int. Cl.[4] .......... B21D 53/10; F16C 3/03
[52] U.S. Cl. .......... 29/149.5 R; 29/148.4 A; 29/DIG. 26; 74/431; 464/168; 384/49
[58] Field of Search .......... 29/149.5 R, 148.4 A, 29/DIG. 26; 409/244; 74/431, 432; 308/6 C, 6 B, 6 A, 6 R; 464/162, 163, 164, 165, 166, 167, 168; 148/13, 39, 130, 191

[56] References Cited

U.S. PATENT DOCUMENTS

| 2,526,341 | 10/1950 | Forkey | 308/6 B X |
| 2,905,008 | 9/1959 | Sears | 464/167 X |
| 3,125,773 | 3/1964 | Zajac | 464/168 X |
| 3,364,699 | 1/1968 | Hufstedler | 464/168 |
| 3,808,839 | 5/1974 | Teramachi | 308/6 C X |
| 4,127,309 | 11/1978 | Teramachi | 308/6 C |
| 4,165,195 | 8/1979 | Teramachi | 403/359 |
| 4,176,888 | 12/1979 | Teramachi | 308/6 R |
| 4,254,639 | 3/1981 | Teramachi | 308/6 C X |

FOREIGN PATENT DOCUMENTS

| 755957 | 12/1933 | France | 308/6 C |
| 1314946 | 12/1962 | France | 308/6 C |
| 283855 | 10/1952 | Switzerland | 308/6 B |
| 679843 | 9/1952 | United Kingdom | 464/168 |
| 710389 | 6/1954 | United Kingdom | 308/6 B |

*Primary Examiner*—Mark Rosenbaum
*Assistant Examiner*—Ronald S. Wallace
*Attorney, Agent, or Firm*—Armstrong, Nikaido, Marmelstein & Kubovcik

[57] ABSTRACT

An unlimited sliding ball spline comprising a spline bearing consisting of an outer cylinder, a ball retainer provided on the inner side of the outer cylinder, and a plurality of balls held by the ball retainer in a plurality of unlimited passages formed on the inner side of the outer cylinder, in such a manner that the balls can be rolled in the unlimited passages; and a spline shaft supported on the plural balls in the spline bearing. The ball spline is capable of making linear, axial reciprocating movements and torque-transmitting rotational movements separately or simultaneously. Especially, the outer cylinder of the spline bearing is provided on a substantially intermediate poriton of an outer surface thereof with a circumferential member used to combine the spline bearing with a third member, such as a housing, or transmit and receive power to and from a third member.

6 Claims, 17 Drawing Figures

UNLIMITED SLIDING BALL SPLINE ASSEMBLY

This application is a continuation of application Ser. No. 465,926, filed 2-14-83.

BACKGROUND OF THE INVENTION

This invention relates to an unlimited sliding ball spline assembly.

A machine basically consists of a linearly moving mechanism and a rotationally moving mechanism. Moving mechanisms for making these movements separately or together are employed in many machines and mechanical parts, for example, spindles for various types of machine tools, support posts or arms for industrial robots, precision index shafts, riveting machines, transfer machines, automatic carrying apparatuses, auto-loaders, and tire-molding machines. It has been increasingly demanded that ball splines to be used for the above purposes, which have highly-improved performance, become available.

Conventional unlimited sliding ball splines of this kind include, for example, an endless sliding ball spline shaft bearing (refer to U.S. Pat. No. 3,808,839) consisting of a spline bearing composed of an outer cylinder, a ball retainer provided on the inner side of the outer cylinder, and a plurality of balls held by the ball retainer in a plurality of endless passages, which are formed in an inner surface of the outer cylinder, in such a manner that the balls can be rolled in the endless passages; and a spline shaft supported on the plural balls in the spline bearing in such a manner that the spline shaft can be moved linearly and reciprocatingly in the axial direction thereof. Conventional ball splines of this kind also include a ball spline, which is provided with a mounting flange formed integrally with and at one end portion of an outer surface of an outer cylinder of a spline bearing similar to the above-mentioned spline bearing, to thereby furnish the ball spline with a capability of being mounted easily on a third member, such as a housing.

However, in order to form a compound moving mechanism for making linear, axial reciprocating movements and torque-transmitting rotational movements together, by using the former ball spline, it is necessary to prepare power-transmitting gears, a cylindrical member for mounting these gears thereon, and a bearing for mounting the moving mechanism on a housing. This causes an increase in the number of parts and manufacturing cost. Moreover, even when each part is processed at the highest possible accuracy, the processing errors in the parts are accumulated to make it difficult to increase the processing accuracy of the moving mechanism as a whole. Such a moving mechanism has many other problems; designing the moving mechanism is very troublesome, and forming it compactly is difficult.

Conventional ball splines including the latter ball splines, especially, an unlimited sliding ball spline provided in a place where it is used under severe conditions with a vibration impact load received thereon, and used in a place where it requires to be positioned at a high accuracy or have high-speed moving performance, require to have a high rigidity and a high processing accuracy. Accordingly, in order to manufacture an outer cylinder of a spline bearing in a conventional ball spline of this kind, very troublesome operations are required; such an outer cylinder is manufactured by subjecting a solid material to a turning process to form a thick-walled tubular body, broaching an inner surface of the tubular body to form ball guide grooves, ball-burnishing the loaded ball guide grooves, subjecting the resulting product to cementation hardening, subjecting the hardened product at its end portion to a turning process to form a flange thereon, ball-burnishing the resulting product again, grinding the guide grooves, and finally mounting the outer cylinder thus formed on a spline shaft to then grind an outer circumferential surface of the outer cylinder and the flange portion thereof. Especially, if an outer cylinder is subjected to a turning process before it has been cementation-hardened, to form a mounting flange thereon during the production of an outer cylinder having a mounting flange at one end portion of the outer surface thereof, strain occurs in the outer cylinder due to the differences between the thicknesses of various parts thereof when it is subjected to a cementation hardening step. Accordingly, it is necessary that an outer cylinder be subjected to a turning process for the formation of a mounting flange after it has been cementation-hardened. In fact, a turning process for forming a mounting flange on an outer cylinder takes very much time and costs a great deal.

Let the spotlight of attention be focused upon the movements of balls in an unlimited sliding ball spline. The balls are circularly moved as they are rolled in an endless, unlimited passage defined by guide grooves in an outer cylinder and guide grooves and elongated grooves in a ball retainer fitted in the outer cylinder. The outer cylinder is ideally expanded outward at both end portions thereof to allow the balls in the endless passage to be rolled smoothly from a no-load region to a load region, or from a load region to a no-load region. The effect thus obtained is called "crowning effect".

The guide grooves provided in such a conventional ball spline are polished with a rod type oil-stone, i.e. subjected to a so-called crowning process, after they have been ground, so as to allow the ball spline to display excellent crowning effect. However, the crowning process cannot help being carried out manually. In addition, it is necessary that the six or more guide grooves formed in the inner surface of the outer cylinder be polished uniformly with attention paid to the size of a hollow in the outer cylinder so as to fit a spline shaft therein properly. This causes the efficiency of the crowning process to decrease to an extremely low level. Eliminating the above-mentioned inconveniences has been a serious problem.

Known ball splines of this kind further include a ball spline provided with a bearing, which is used to roll-guide linear, axial reciprocating movements, rotational movements, and a combination of these movements, of moving mechanisms, and which consists of a tubular outer cylinder, a ball retainer fitted in the outer cylinder and having a length smaller than that thereof, and a plurality of balls held in the ball retainer in such a manner that a load of a shaft is applied equally to the balls.

However, in such a conventional bearing, a stroke of a linear, axial reciprocating movement of a spline shaft is limited to a distance, which is two times as long as a distance, for which the ball retainer can be moved in the outer cylinder. In the case where a large stroke of a spline shaft is required, it is necessary that the length of the outer cylinder be increased in accordance with the same stroke. Accordingly, in a machine, in which it is difficult to mount thereon a ball spline having a bearing with a long outer cylinder, a stroke of a spline shaft cannot be increased. Even when a machine permits a ball spline having a bearing with a long outer cylinder to be mounted thereon, the dimensions of the machine are unnecessarily increased.

SUMMARY OF THE INVENTION

The present invention provides a ball spline comprising a spline bearing consisting of an outer cylinder, a ball retainer fitted in the outer cylinder, and a plurality of balls held by the ball retainer in such a manner that the balls can be rolled in a plurality of unlimited passages formed in an inner surface of the outer cylinder; and a spline shaft supported on the plural balls in the spline bearing, the ball spline being adapted to make linear, axial reciprocating movements and torque-transmitting rotational movements separately or simultaneously. A circumferential member, the axis of which is in agreement with that of the outer cylinder of the spline bearing, is provided on a substantially intermediate portion of an outer surface of the same outer cylinder, the circumferential member consisting of a mounting flange or a power-transmitting member formed integrally with the outer cylinder, or a support bearing composed of a pair of angular contact bearings and a spacer interposed therebetween. This ball spline permits settling owing to the above-mentioned construction thereof various problems encountered in conventional unlimited sliding ball splines of this kind.

An object of the present invention is to provide an unlimited sliding ball spline capable of making linear, axial reciprocating movements and torque-transmitting rotational movements separately or simultaneously, having a circumferential member consisting of a mounting flange or a power-transmitting member, provided with a spline bearing with an outer cylinder having crowning effect and capable of being manufactured at a low cost, and remarkably improved in the rigidity of the central portion of the outer cylinder, to which the greatest load is applied during a torque-transmitting operation, to serve to prevent the outer cylinder from being deformed.

Another object of the present invention is to provide an unlimited sliding ball spline having a mounting flange formed integrally with and on a substantially intermediate portion of an outer surface of an outer cylinder, capable of being mouted on a third member, such as a housing, and permitting a third member, such as a gear to be mounted on the outer cylinder easily.

Still another object of the present invention is to provide an unlimited sliding ball spline for making compound movements, having a power transmitting member formed integrally with and on a substantially intermediate portion of an outer surface of an outer cylinder to transmit and receive power to and from a third member, and capable minimizing the number of parts and being manufactured at a high accuracy and compactly.

A further object of the present invention is to provide an unlimited sliding ball spline having an outer cylinder, the length of which does not restrict a stroke of a spline shaft, and capable of roll-guiding a combination of linear reciprocating movements and rotational movements of a moving mechanism, and easily applying pressure to a support bearing constituting a circumferential member utilized to mount the ball spline on a third member.

The above and other objects as well as advantageous features of the invention will become apparent from the following description of the preferred embodiments taken in conjunction with the accompanying drawings.

DESCRIPTION OF THE PREFERRED EMBODIMENTS:

Embodiments of an unlimited sliding ball spline according to the present invention will now be described on the basis of the accompanying drawings.

Figure 1:
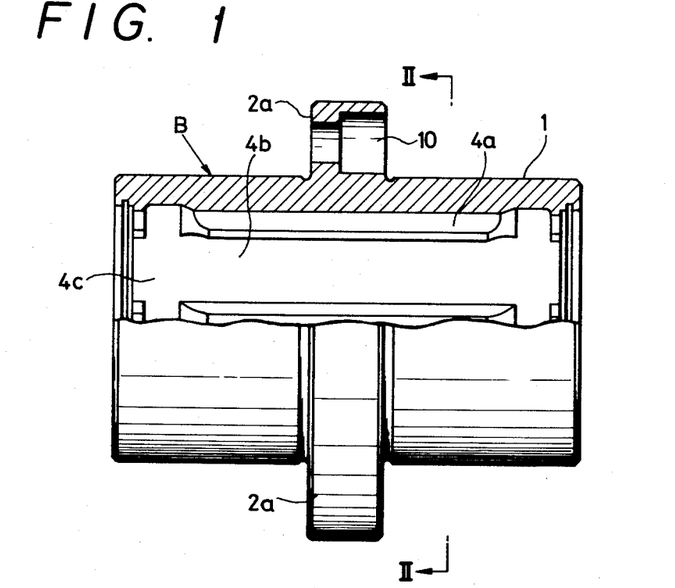
FIG. 1 is a front elevational view partially in section of an outer cylinder used for a spline bearing in a first embodiment of an unlimited sliding ball spline according to the present invention.
Figure 2:
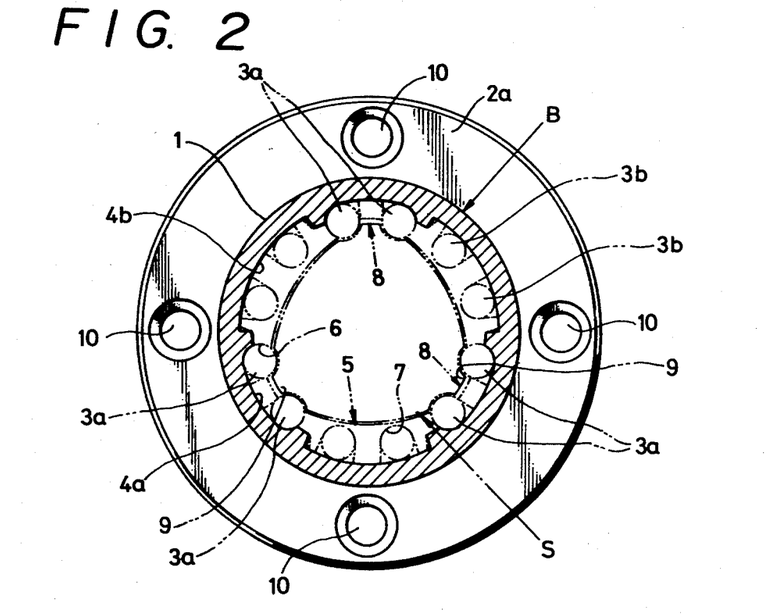
FIG. 2 is a sectional view taken along the line II—II in FIG. 1.
Figure 3:
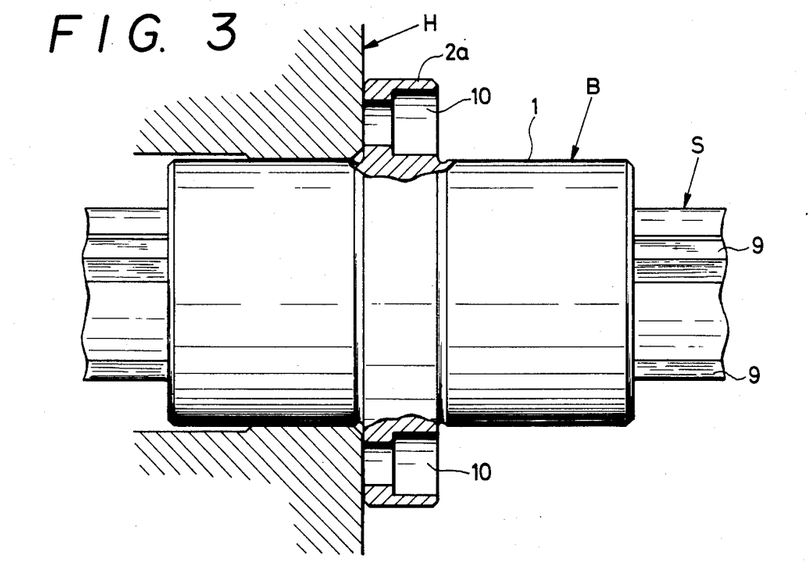
FIG. 3 is a partially sectional view illustrating the unlimited sliding ball spline shown in FIG. 1, which is in a mounted state.

FIGS. 1–3 show a first embodiment of an unlimited sliding ball spline. This ball spline consists of a spline bearing B, and a spline shaft S supported on a plurality of balls $3a$, $3b$ provided in the spline bearing B.

The spline bearing B consists of an outer cylinder 1 having on a substantially intermediate portion of an outer surface thereof a mounting flange as a circumferential member, and in an inner surface thereof guide grooves $4a$ for loaded balls $3a$, which are formed so as to have a substantially U-shaped cross section, and which extend in the axial direction thereof, guide grooves $4b$ for non-loaded balls $3b$, which have a depth substantially equal to that of the guide grooves 4a and a width greater than that of the guide grooves 4a, and which extend in the axial direction thereof in such a manner that the guide grooves 4b alternate with the guide grooves 4a, and guide grooves 4c communicating the guide grooves 4a, 4b with one another and extending in the circumferential direction of the outer cylinder 1; a ball retainer 5 formed cylindrically with a steel plate or a hard synthetic resin, fitted in the outer cylinder 1, and provided with slits 6 in positions opposed to the guide grooves 4a for the loaded balls 3a, and grooves 7 in positions opposed to the guide grooves 4b for the non-loaded balls 3b, in such a manner that the slits 6 and grooves 7 form an unlimited passage for the balls 3a, 3b in cooperation with the guide grooves 4a, 4b, 4c, which ball retainer 5 permits preventing the dislocation of the balls 3a, 3b; and a plurality of balls 3a, 3b adapted to be circularly moved in the unlimited passage as the loaded balls 3a receive a load from the spline shaft S and as the non-loaded balls 3b do not receive a load therefrom.

The spline shaft S has thereon axially extending projections 9 fitted in recesses 8, each of which is formed between a pair of adjacent rows of loaded balls 3a partially projecting from the relative slit 6 in the ball retainer 5 in the spline bearing B, the number of the projections 9 being in agreement with that of the paired rows of loaded balls 3a. The projections 9 are supported by the loaded balls 3a in such a manner that the projections 9 can be moved slidingly in the axial direction.

The mounting flange 2a on the outer cylinder 1 of the spline bearing B in this embodiment is formed concentrically therewith. The flange 2a has holes 10 in symmetric positions thereon, through which holes 10 bolts are inserted when the ball spline is attached to a housing H.

Figure 4:
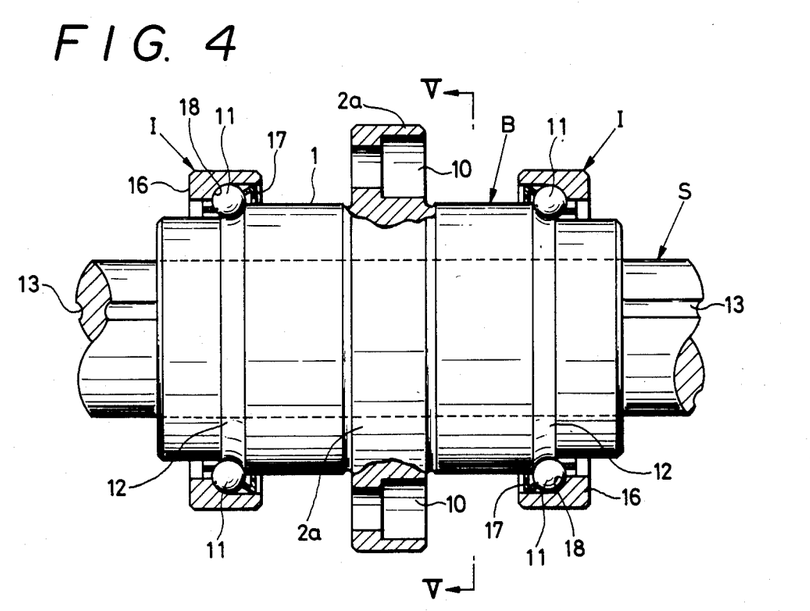
FIG. 4 is a front elevational view partially in section of an outer cylinder for a spline bearing in a modification of the first embodiment of unlimited sliding ball spline.
Figure 5:
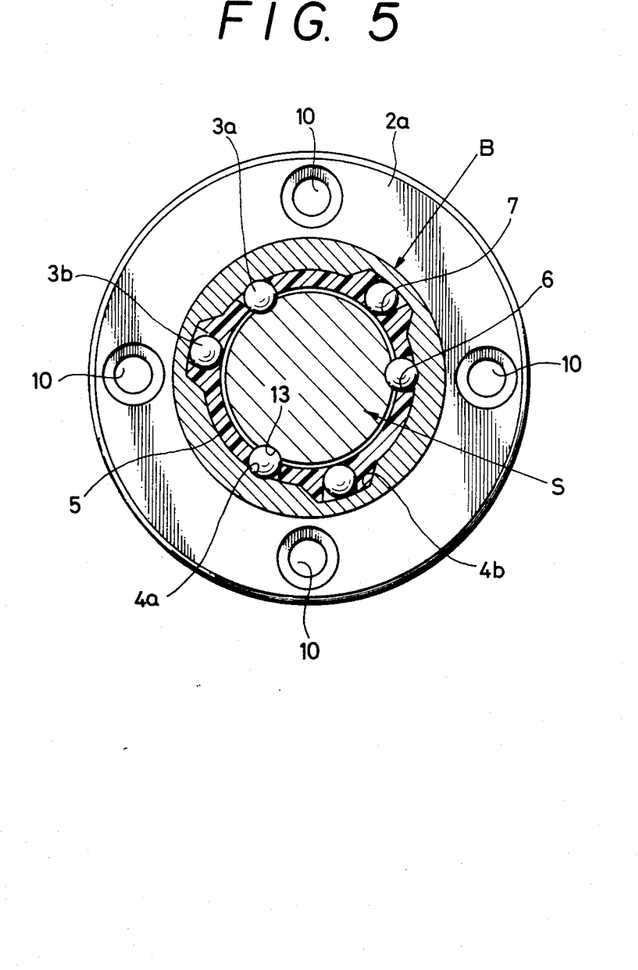
FIG. 5 is a sectional view taken along the line V—V in FIG. 4.

Unlike the above embodiment shown in FIGS. 1-3, an unlimited sliding ball spline in a modification thereof shown in FIGS. 4 and 5 has stepped portions at both end sections of an outer surface of an outer cylinder 1 of a spline bearing B therein. The stepped portions are so formed that a pair of mounting bearings I, which consist of angular contact bearings having no axial clearances, can be set thereon. Grooves 12 having a substantially arcuate cross section, in which grooves 12 balls 11 in the mounting bearing I are rolled, are formed in the corners of the stepped portions. The outer cylinder 1 is provided in an inner surface thereof with cross-sectionally arcuate grooves 4a for loaded balls 3a, each of which guide grooves 4a has a radius substantially equal to that of each of the loaded balls 3a. A spline shaft S is also provided with cross-sectionally arcuate ball-rolling grooves 13 similar to the guide grooves 4a. The loaded balls 3a are rolled between the guide grooves 4a and ball-rolling grooves 13 as they receive a load thereon.

Figure 6:
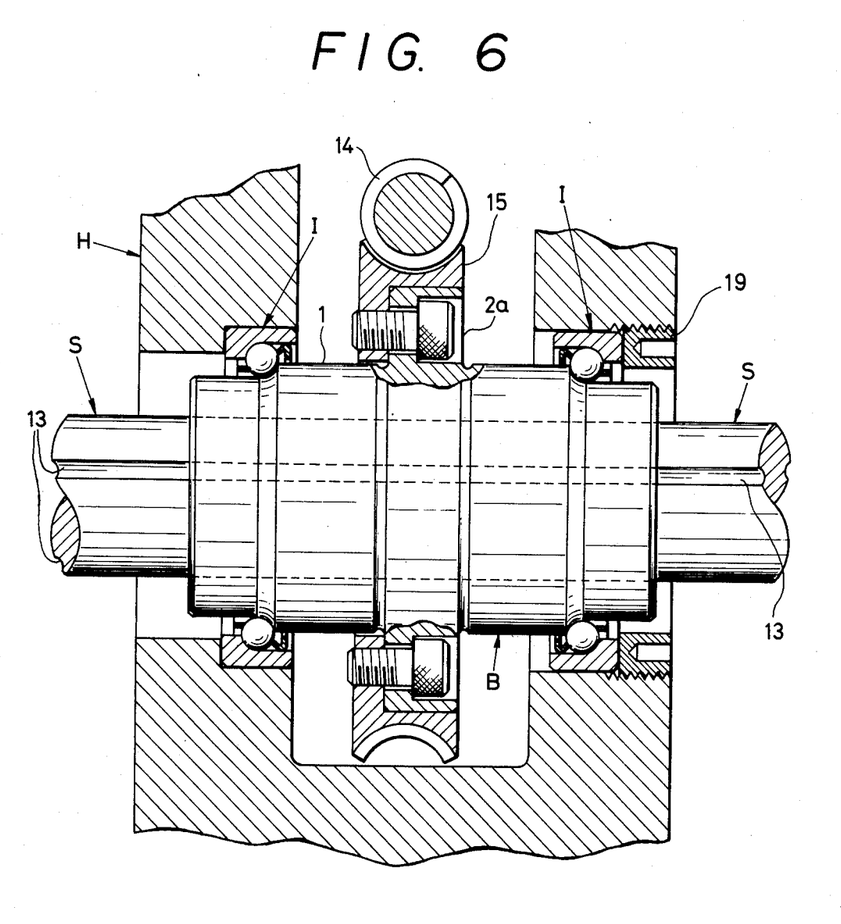
FIG. 6 is a partially sectional view of an example of use of the unlimited sliding bearing shown in FIG. 4.

In the unlimited sliding ball spline in this modification, a worm 15 engageable with a worm gear 14 is set on a mounting flange 2a of the outer cylinder 1 in such a manner as shown in, for example, FIG. 6. The ball spline is fixed to a housing H with nuts 19 via the mounting bearings I, which are provided on both end portions of the outer surface of the outer cylinder 1, as a pre-pressure is applied to the mounting bearings I. Thus, the torque-transmitting rotational movement of the worm gear 14 can be combined with the linear, axial movements of the spline shaft S. In this modification, each of the mounting bearings I consists of an angular contact bearing composed of an outer cylinder 16, a plurality of balls 11 provided in ball-rolling grooves 18 formed in an inner surface of the outer cylinder 16, and a retainer 17 adapted to hold these balls 11. The mounting bearings I may be any type of bearings if they permit the spline bearing B to be rotatably mounted on the housing H; the mounting bearings I may consist of, for example, needle bearings.

An example of a process for manufacturing the outer cylinder 1 of the spline bearing B in the above-described first embodiment of unlimited sliding ball spline will now be described. First, a solid material is subjected to a turning process to form a thick-walled tubular body, an outer surface of which is then subjected to a turning process to form a mounting flange 2a. An inner surface of the tubular body is broached to form guide grooves 4a, 4b, 4c for balls 3. The guide grooves for loaded balls 3a are ball-burnished. The resulting tubular body is then cementation-hardened, and the guide grooves 4a are ball-burnished again. The tubular body is then set on the spline shaft S, and the outer surface of the tubular body and the mounting flange 2a are ground. The process for manufacturing the outer cylinder 1 is not, of course, limited to the above example. In order to improve the efficiency of manufacturing the outer cylinder 1, the turning step for forming the mounting flange 2a should be carried out before the cementation-hardening step.

According to the unlimited sliding ball spline in the first embodiment, when a tubular body is cementation-hardened during the production of an outer cylinder 1 of a spline bearing B, an inner portion of a substantially intermediate section, in which a mounting flange 2a is positioned, of the outer cylinder 1 is expanded inward. The cementation hardening causes the so-called crowning effect to be produced in the outer cylinder 1. In a conventional process for manufacturing an outer cylinder, a tubular body is subjected to a turning step for forming a flange on an outer surface thereof, after the tubular body has been cementation-hardened, for the purpose of obtaining an outer cylinder at an improved accuracy. According to the present invention, a soft tubular body, which has not yet been cementation-hardened, can be subjected to a turning step for forming a mounting flange 2a thereon, so that the operation efficiency in the turning step can be improved to a great extent. Moreover, according to the first embodiment, an inner portion of a substantially intermediate section of the outer cylinder 1 is expanded inward owing to the cementation-hardening step carried out after the mounting flange 2a has been formed, to allow the balls 3a, 3b to be rolled smoothly, i.e. the so-called crowning effect is produced. Consequently, troublesome operations carried out in a conventional process after a cementation-hardening step has been completed, for example, the steps of grinding and crowning guide grooves 4a for loaded balls 3a, can be omitted. Therefore, the operation efficiency of the process used in the present invention for the production of an outer cylinder 1 is incomparably superior to that of a conventional process of this kind. This allows the cost of manufacturing unlimited sliding ball bearings to be reduced to a great extent.

In addition, according to the first embodiment, in which the mounting flange 2a is positioned on the substantially intermediate portion of the outer surface of the outer cylinder 1, the thickness of the intermediate portion, to which the highest load is applied during a torque-transmitting operation, of the outer cylinder 1 is extremely large. Accodingly, the rigidity of the intermediate portion of the outer cylinder 1 is remarkably high, and the deformation of the outer cylinder 1 can be perfectly prevented during a torque-transmitting operation.

In the description of the first embodiment, the phrase, "a substantially intermediate portion" regarding the position, in which the mountng flange 2a is formed, on the outer cylinder 1. This means that the mounting flange 2a may be formed on such a portion of the outer surface of the outer cylinder 1 that is close to the intermediate portion thereof, and does not, of course, mean that the mounting flange 2a should be formed on the exactly intermediate portion only of the outer surface of the outer cylinder 1.

Figure 7:
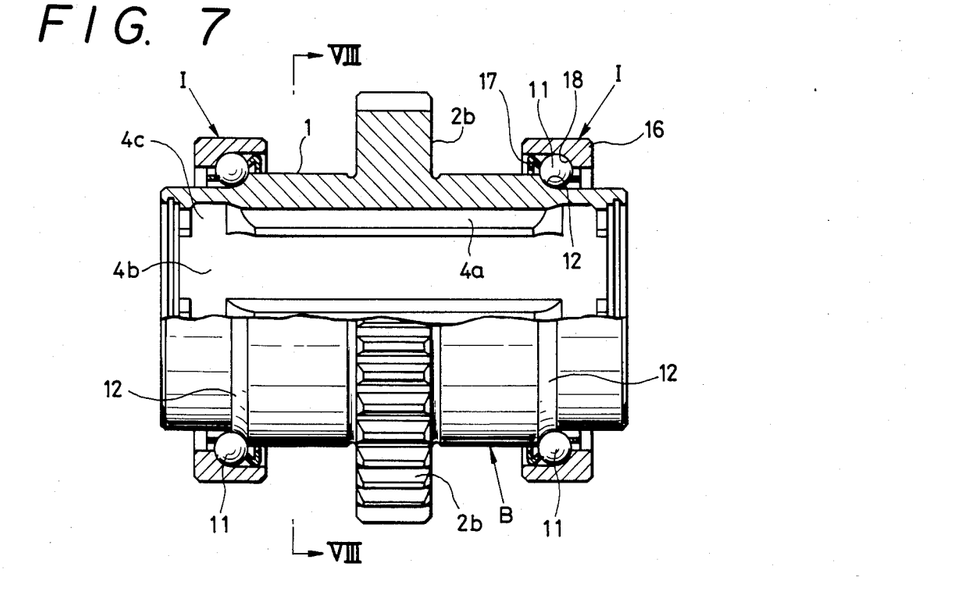
FIG. 7 is a front elevational view partially in section of an outer cylinder of a spline bearing in a second embodiment of an unlimited sliding ball spline according to the present invention.
Figure 8:
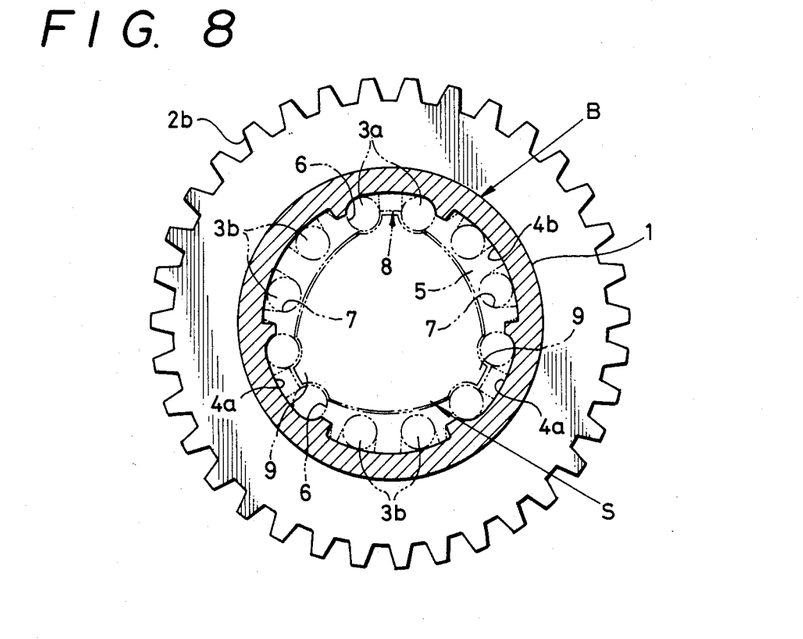
FIG. 8 is a sectional view taken along the line III-—III in FIG. 7.
Figure 9:
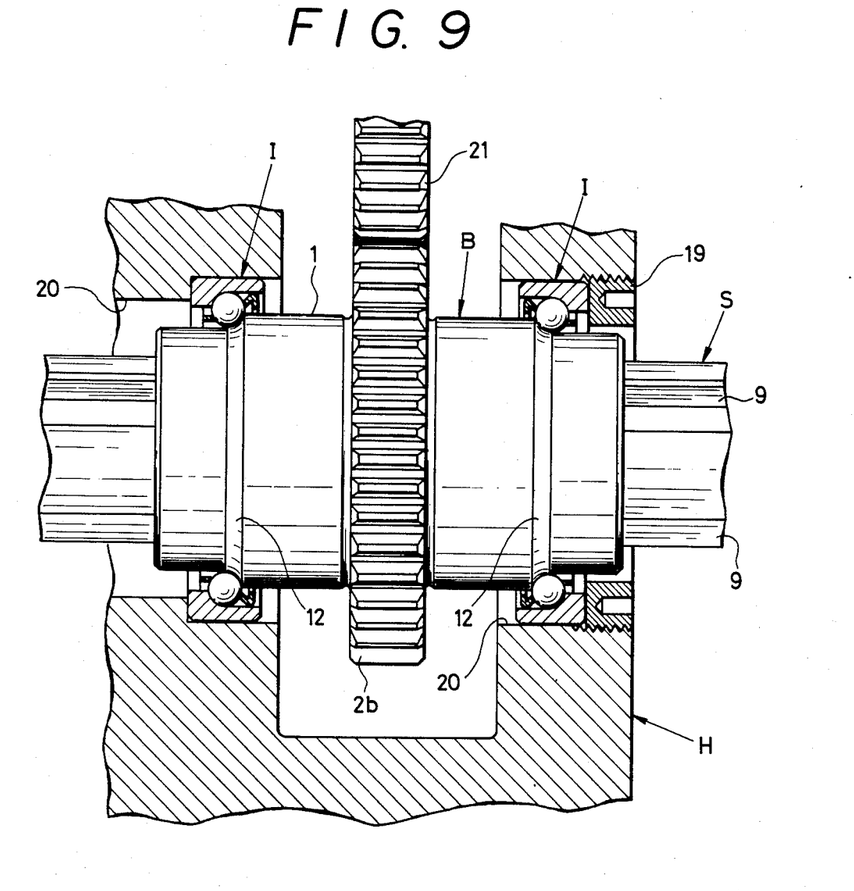
FIG. 9 is a partially sectional view illustrating the unlimited sliding ball spline in the second embodiment, which is in a mounted state.

FIGS. 7-9 among the accompanying drawings show an unlimited sliding ball spline for making compound movements, which constitutes a second embodiment of the present invention. This ball spline consists of a spline bearing B, and a spline shaft S supported on a plurality of balls 3a, 3b provided in the spline bearing B, just as the ball spline shown in FIGS. 1-3 but the former ball spline is different from the latter ball spline. The ball spline shown in FIGS. 7-9 is provided with a power-transmitting member 2b serving as a circumferential member and formed integrally with and on a substantially intermediate portion of an outer surface of an outer cylinder 1 of the spline bearing B. The ball spline is also provided with a pair of mounting bearings I just as the ball spline shown in FIG. 4, which mounting bearings I are provided on both end portions of an outer surface of the outer cylinder 1 and consist of angular contact bearings for use in rotatably mounting the spline bearing B on a housing H. In this embodiment, the power-transmitting member 2b consists of a spur gear.

According to the ball spline for making compound movements in the second embodiment, the spline bearing B is fitted as shown in, for example, FIG. 9, in a mounting bore 20 in the housing H via the mounting bearings I, and fixed therein with nuts 19 as a pre-pressure is applied to the mounting bearings I. A gear, such as an idle gear 21 for transmitting power to the power-transmitting member 2b formed on the outer surface of the outer cylinder 1 is meshed therewith to cause the spline shaft S, which is fitted in the spline bearing B, to be moved linearly in the axial direction thereof. At the same time, the spline bearing B, which receives power from the idle gear 21, is rotated. Thus, the spline shaft S can make linear and rotational movements simultaneously.

Figure 10:
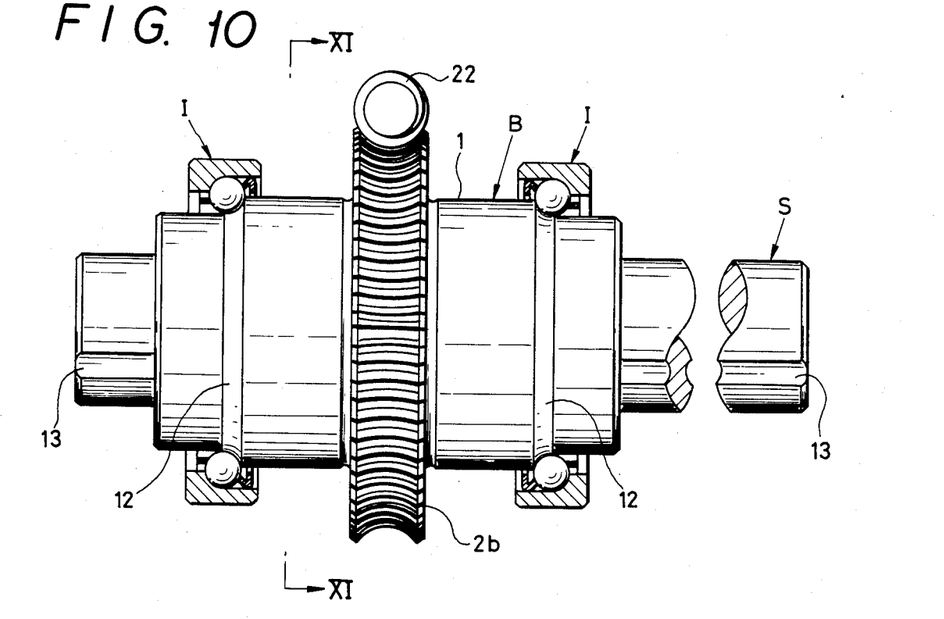
FIG. 10 is a front elevational view partially in section of an outer cylinder of a spline bearing in a modification of the second embodiment of unlimited sliding ball spline.
Figure 11:
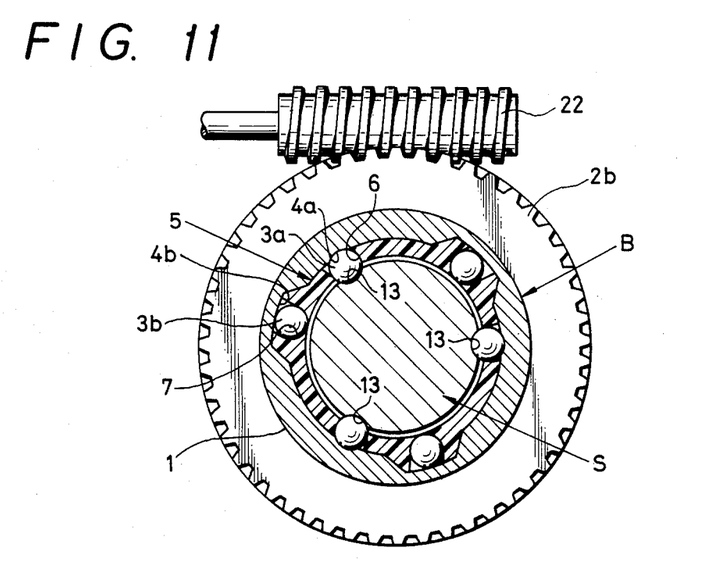
FIG. 11 is a sectional view taken along the line XI—XI in FIG. 10.

In a modification, which is shown in FIGS. 10 and 11, of the second embodiment, which modification is different from the ball spline shown in FIGS. 7-9, a power-transmitting member 2b formed integrally with and on a substantially intermediate portion of an outer surface of an outer cylinder 1 consists of a worm gear. In addition, guide grooves 4a for loaded balls 3a, which are provided in an inner surface of the outer cylinder 1, are arcuately formed, and has a radius substantially equal to that of the balls 3a. A spline shaft S is also provided with ball-rolling grooves 13, which are formed arcuately in the same manner as the guide grooves 4a. The loaded balls 3a can thereby be rolled between these guide grooves 4a and ball-rolling grooves 13 as they receive a load thereon.

According to this modification, in which the power-transmitting member 2b consists of a worm gear, the rotation of the spline bearing B, i.e. the rotational movement of the spline shaft S can be stopped to lock the spline bearing B and spline shaft S as necessary by stopping a worm 22 meshed with the power-transmitting member 2b.

In the second embodiment, the power-transmitting member 2b consists of a spur gear or a worm gear. This power-transmitting member 2b may consist of a member capable of transmitting rotational power to another member; it may consist of, for example, a pulley.

In the unlimited sliding ball spline in the second embodiment, the power-transmitting member 2b is formed integrally with and on the substantially intermediate portion of the outer surface of the outer cylinder 1 constituting the spline bearing B therein, in such a manner that the power-transmitting member 2b extends in the circumferential direction of the outer cylinder 1. Also, the mounting bearings I are provided on both end portions of the outer surface of the outer cylinder 1, which mounting bearings I are fixed to the housing H to rotatably hold the outer cylinder 1. Therefore, the ball spline can be attached directly to the housing H via the mounting bearings I. Moreover, it is unnecessary to form the power-transmitting member separately, which is provided on the outer cylinder 1, and any additional tubular body for mounting a separately-formed power-transmitting member on the outer cylinder. This allows the number of parts of the ball spline to be reduced remarkably. Accordingly, there is no possibility that the processing errors in the parts of the ball spline are accumulated into a great overall processing error. The ball spline as a whole can be formed at a high accuracy and compactly. The ball spline can also be designed very easily.

In addition, since the power-transmitting member 2b in the second embodiment is formed on the substantially intermediate portion of the outer surface of the outer cylinder 1, which constitutes the spline bearing B, in such a manner that the power-transmitting member 2b extend in the circumferential direction of the outer cylinder 1, completely the same process for manufacturing the outer cylinder 1 as is employed in the first embodiment can be utilized. Namely, a tubular body can be subjected to a turning step to form the power-transmitting member 2b before it has been cementation-hardened. When the tubular body is cementation-hardened, the inner portion of a substantially intermediate section of the outer cylinder 1 is expanded inward, and the so-called crowning effect can thus be displayed. This allows the operation efficiency in the production of outer cylinders 1 to be improved remarkably, and serves to reduce the cost of manufacturing the outer cylinders.

Since the power-transmitting member 2b is formed integrally with and on the substantially intermediate portion of the outer surface of the outer cylinder 1, the thickness of the intermediate portion, to which the highest load is applied during a torque transmitting operation, of the wall of the outer cylinder 1 becomes very large, so that the rigidity of the outer cylinder 1 is improved remarkably. Accordingly, the deformation of the outer cylinder 1 during a torque transmitting operation can be perfectly prevented. Moreover, since the mounting bearing I consists of an angular contact bearing, an inner race therefor can be omitted. This allows the ball spline as a whole to be formed compactly.

In the second embodiment, the position, in which the power-transmitting member 2b is provided, may also be a position close to the intermediate portion of the outer surface of the outer cylinder 1, just as in the first embodiment.

Figure 12:
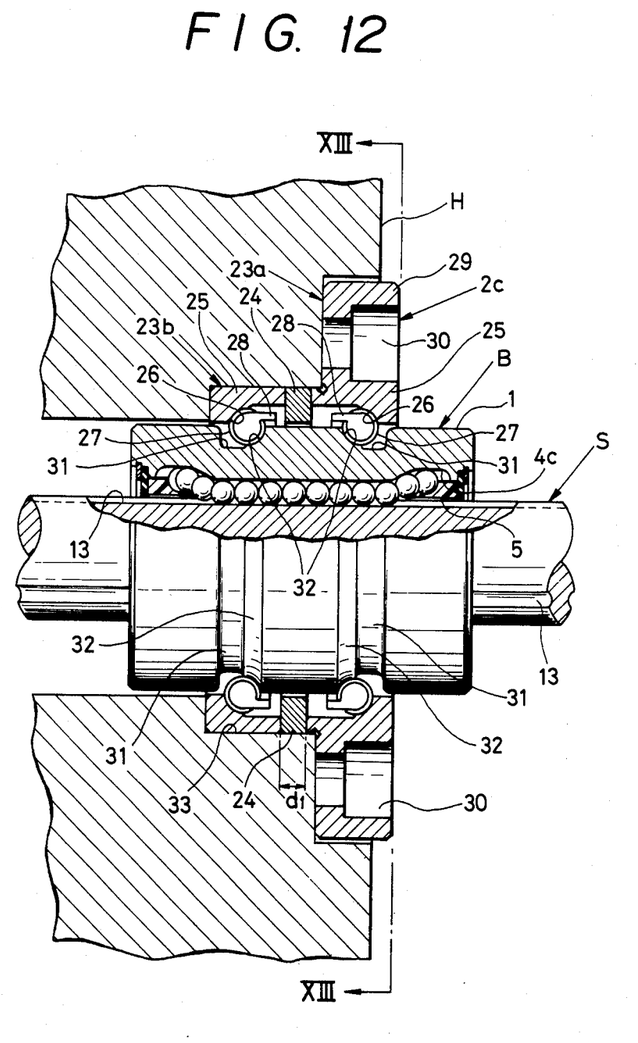
FIG. 12 is a partially sectional view of an unlimited sliding ball spline with a support bearing, which constitutes a third embodiment of the present invention.
Figure 13:
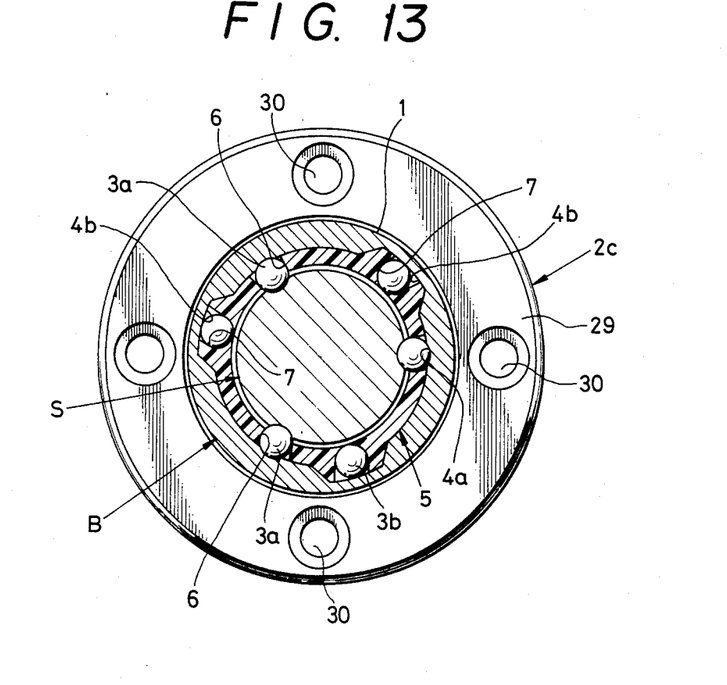
FIG. 13 is a sectional view taken along the line XIII-—XIII in FIG. 12.

FIGS. 12 and 13 among the accompanying drawings show an unlimited sliding ball spline for guiding compound rolling movements of a moving mechanism, which constitutes a third embodiment of the present invention. This ball spline consists of a spline bearing B, and a spline shaft S supported on a plurality of balls 3a, 3b provided in the spline bearing B, just as the first and second embodiments described above. However, the third embodiment is different from the first and second embodiments in that a support bearing 2c consisting of a pair of angular contact bearings 23a, 23b, and a spacer 24 is provided as a circumferential member on an outer cylinder 1 of the spline bearing B.

Each of the angular contact bearings 23a, 23b consists of an outer race 25, a plurality of balls provided in ball-rolling grooves 26 formed in an inner surface of the outer race 25 so as to extend in the circumferential direction thereof, and a retainer 28 for preventing these balls from being dislocated. The balls 27 can be rolled freely in the grooves 26 in the outer race 25 as they are held by the retainer 28. One angular contact bearing 23a has a flange portion 29 formed along an outer circumferential surface of the outer race 25 and provided with holes 30, through which fastening members (not shown), such as bolts are to be inserted.

The spline bearing B mentioned above and constituting the ball spline is constructed in the same manner as the spline bearings shown in FIGS. 5 and 11. The spline bearing B in the third embodiment is provided with a pair of ball-rolling grooves 31 having a substantially arcuate cross section and formed on the portions of the outer surface of the outer cylinder 1 which are close to an intermediate portion thereof to extend in the circumferential direction of the outer cylinder 1. Each of the balls 27 in the two angular contact bearings 23a, 23b can be rolled on a bearing surface 32 formed in each of the ball-rolling grooves 31 and having a radius of curvature substantially equal to that of the balls 27.

In this embodiment, the bearing surfaces 32 are formed in the adjacent angular portions of the ball-rolling grooves 31. When the angular contact bearings 23a, 23b are mounted on the outer cylinder 1 of the spline bearing B, the directions, in which a load is applied from the balls 27 therein to the bearing surfaces 32, are to meet with one another in the same point. Also, when the angular contact bearings 23a, 23b are mounted on the outer cylinder 1 of the spline bearing B, a clearance having a predetermined size is to be formed between end surfaces of the same bearings 23a, 23b. The ring type spacer 24 having a thickness $d_1$ somewhat smaller than the size of the clearance is inserted therein.

Therefore, in order to mount the unlimited sliding ball spline in the third embodiment on a housing H, one angular contact bearing 23b in the support bearing 2c is fitted in a mounting recess 33 formed in the housing H, to fix the ball spline thereto with fastening members via the flange portion 29 provided on the outer race 25 of the other angular contact bearing 23a. At this time, the tightening force is applied to the bearing surfaces 32, balls 27 and ball-rolling grooves 26 in the inner surface of the outer race 25, so that a gap due to the difference between the thickness $d_1$ and size of the clearance between the angular contact bearings 23a, 23b is eliminated; i.e. a pre-pressure is applied to the angular contact bearings 23a, 23b.

Figure 14:
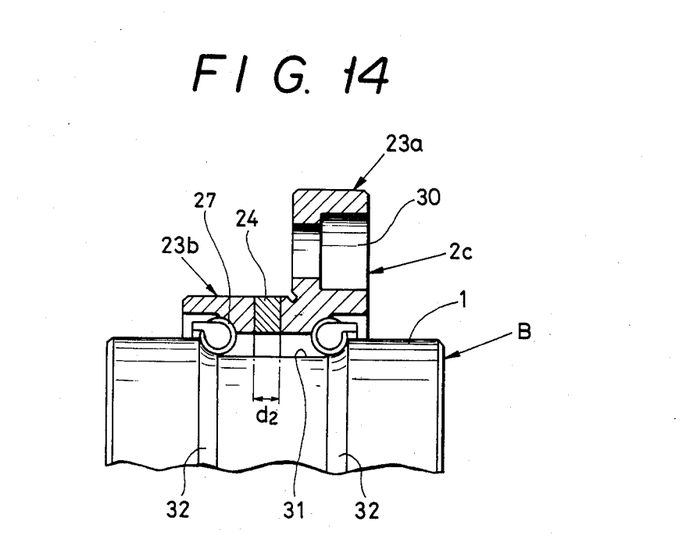
FIG. 14 is a partially sectional view of a part of a modification ot the third embodiment of unlimited sliding ball spline.

In an unlimited sliding ball spline in a modification shown in FIG. 14 of the third embodiment, which ball spline is different from that shown in FIGS. 12 and 13, a wider ball-rolling groove 31 is formed in a substantially intermediate portion of an outer surface of an outer cylinder 1 of a spline bearing B, and bearing surfaces 32 in the right and left angular portions thereof. These bearing surfaces 32 face in such directions that, when angular contact bearings 23a, 23b are mounted on the outer cylinder 1 of the spline bearing B, the directions, in which a load is applied from balls 27 to the bearing surfaces 32, diverge. A spacer 24 having a thickness $d_2$ somewhat greater than the size of a clearance between the angular contact bearings 23a, 23b is inserted therein to thereby apply a pre-pressure to the angular contact bearings 23a, 23b.

Therefore, according to the unlimited sliding ball spline in this modification, a pre-pressure can be applied to the angular contact bearings 23a, 23b by the spacer 24 even when a mounting recess, with which an end surface of one angular contact bearing 2c can be brought into contact, is not provided in a housing H.

Figure 15:
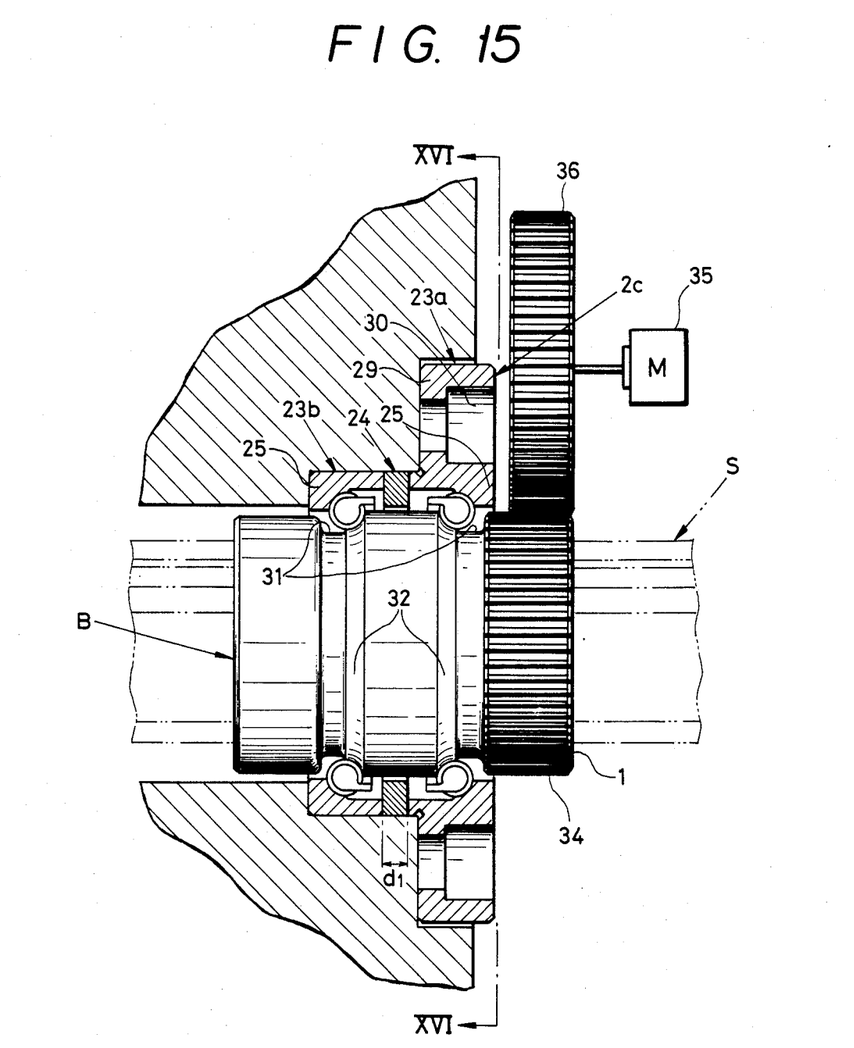
FIG. 15 is a sectional view of an unlimited sliding ball spline with a spline shaft omitted of another modification of the third embodiment.
Figure 16:
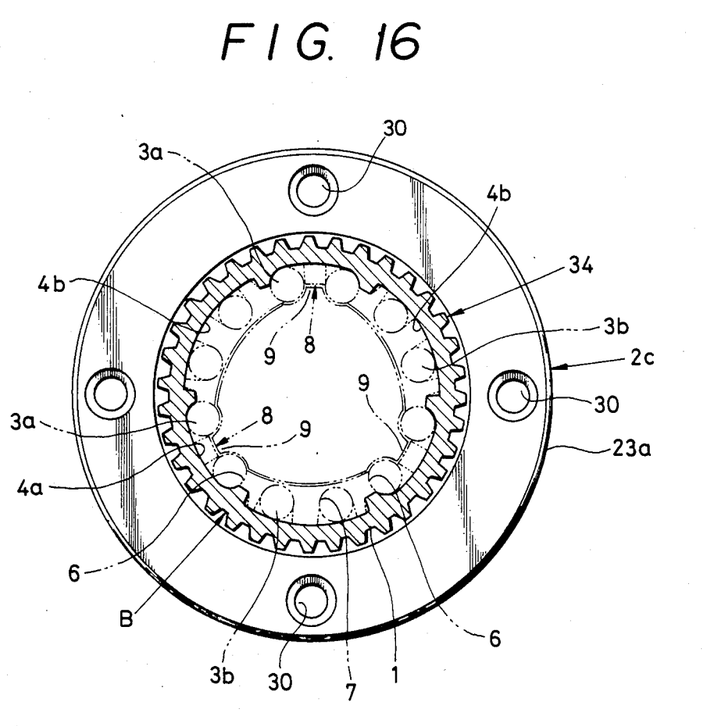
FIG. 16 is a sectional view taken along the line XVI-—XVI in FIG. 15.
Figure 17:
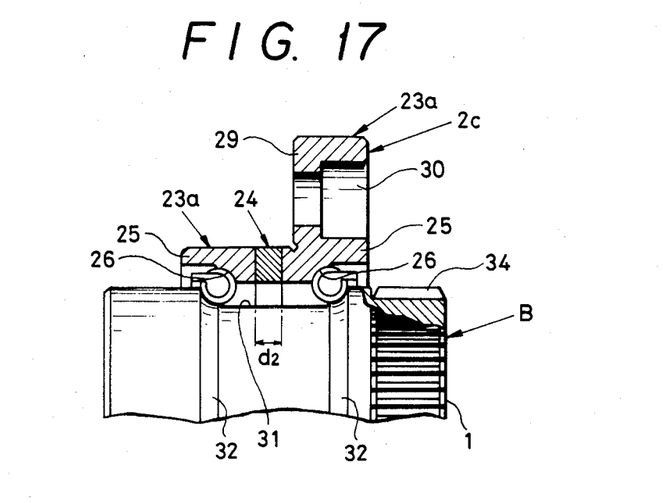
FIG. 17 is a partially sectional view similar to FIG. 14, showing still another modification of the third embodiment.

FIGS. 15–17 show two other modifications of the third embodiment. The modification shown in FIGS. 15 and 16 is formed in the same manner as the embodiment shown in FIGS. 12 and 13, except that a gear 34 is formed on the portion of an outer surface of an outer cylinder 1 of a spline bearing B which is on the outer side of an angular contact bearing 23a having a flange portion 29, in such a manner that the teeth of the gear 34 are arranged in the circumferential direction of the same angular contact bearing 23a. This gear 34 is meshed with a gear directly connected to a motor 35, which is used to apply the rotational force to the spline bearing B, or a power gear 36 consisting of an idle gear meshed with the motor-connected gear to transmit power thereto. The modification shown in FIG. 17 is formed in the same manner as the modification shown in FIG. 14, except that a gear 34 is formed on an end portion of an outer surface of an outer cylinder 1 of a spline bearing B in the same manner as in the modification shown in FIGS. 15 and 16. In each of the ball splines in the above modifications, a three pairs of rows of loaded balls 3a are provided in an inner surface of the outer cylinder 1 of the spline bearing B in such a manner that each row of loaded balls 3a extend in the axial direction of the outer cylinder 1. The spline shaft S in each of the modifications is provided with axially extending projections 9 adapted to be fitted in recesses, each of which is formed by each pair of rows of loaded balls 3a. The spline shaft S is adapted to be moved slidingly in the axial direction to transmit torque in the rotational direction as it is supported at its projections 9 on the three pairs of rows of loaded balls 3a.

According to the unlimited sliding ball splines in FIGS. 15, 16, 17, the spline bearing B can be rotated directly owing to the gear 34 formed on an end portion of the outer surface of the outer cylinder 1. Accordingly, it is unnecessary to attach to the ball spline any special parts for transmitting a rotational movement to the spline bearing B or the spline shaft S inserted in the spline bearing B in such a manner that the spline shaft S can be moved slidingly in the axial direction thereof. This allows the ball spline to be formed compactly and mounted on the housing H easily.

The gear 34 on the outer cylinder 1 of the spline bearing B can be provided on not only one end portion of the outer surface of the outer cylinder 1 as described above but also both end portions thereof. The gear 34 may not be formed integrally with the outer cylinder 1; it may be formed separately from the outer cylinder 1 to be mounted thereon. In addition, the gear 34 is not limited to a spur gear; it may consist of, for example, a worm gear adapted to receive power via a worm.

In the unlimited sliding ball spline in the third embodiment, the circumferential member provided on the outer cylinder 1 of the spline bearing B consists of a support bearing 2c composed of a pair of angular contact bearings 23a, 23b and spacer 24 the outer cylinder 1 being provided with ball-rolling grooves having bearing surfaces 32, the balls 27 in each of the angular contact bearings 23a, 23b being able to be rolled as they directly contact with bearing surfaces 32 formed on the outer cylinder 1 of the spline bearing B. Therefore, an inner race of each of the angular contact bearings 23a, 23b can be omitted. This allows the dimensions of the angular contact bearings 23a, 23b to be reduced accordingly. Since a pair of angular contact bearings 23a, 23b are unitarily combined with the spline bearing B in the ball spline, the linear, axial movement of the spline shaft S is supported by the spline bearing B, and the rotational movement of the spline bearing B or spline shaft S by the angular contact bearings 23a, 23b. Thus, the ball spline can be used as a bearing for roll-guiding the rotational movement, which has no relation to a stroke of the spline shaft, reciprocating movement, and a combination of the rotational movement and reciprocating movement, of a moving mechanism.

Moreover, according to the third embodiment, in which a spacer 24 is inserted between the angular contact bearings 23a, 23b, these bearings 23a, 23b can be regulated so as to apply a suitable level of pre-pressure thereto due to the thickness $d_1$ or $d_2$ of the spacer 24. This allows the backlash in the angular contact bearings 23a, 23b to be reduced to zero. In addition, when the ball-rolling grooves 26 in the angular contact bearings 23a, 23b and the bearing surfaces 32 formed on the outer cylinder 1 of the spline bearing B are worn to cause the backlash to occur, the spacer 24 has only to be replaced by a spacer having a suitable thickness, to apply a suitable level of pre-pressure again to the angular contact bearings 23a, 23b.

The present invention is not, of course, limited to the above embodiments and modifications; it may be modified in more ways within the scope of the appended claims.

What is claimed is:

1. A method for manufacturing the outer cylinder of an unlimited sliding ball spline bearing, comprising the steps of:

forming a circumferentially extending mounting flange around the outer surface of a thick-walled tubular body;

forming longitudinal guide grooves on the inner surface of said tubular body, said guide grooves having a sufficient diameter for accepting a plurality of rolling balls therein; and subjecting said tubular body to a process of cementation hardening to form a crown on the inner surface thereof, opposite said mounting flange on the outer surface.

2. The method of claim 1, including the step of forming said thick-walled tubular body by turning a solid material.

3. The method of claim 2, wherein said mounting flange is formed by turning the outer surface of the thick-walled tubular body.

4. The method of claim 1, wherein the step of forming said longitudinal guide grooves is accomplished by broaching.

5. The method of claim 1, including the step of ball burnishing said guide grooves before said cementation hardening step.

6. The method of claim 5, including the step of ball burnishing said guide grooves for a second time after said cementation hardening step.

* * * * *